(12) United States Patent
Kneen

(10) Patent No.: US 9,569,766 B2
(45) Date of Patent: Feb. 14, 2017

(54) AUTO-DETECTION OF MERCHANT PAYMENT PREFERENCES

(71) Applicant: PAYPAL, INC., San Jose, CA (US)

(72) Inventor: Benjamin Kneen, Boston, MA (US)

(73) Assignee: PAYPAL, INC., San Jose, CA (US)

( * ) Notice: Subject to any disclaimer, the term of this patent is extended or adjusted under 35 U.S.C. 154(b) by 106 days.

(21) Appl. No.: 14/083,367

(22) Filed: Nov. 18, 2013

(65) Prior Publication Data

US 2015/0142640 A1   May 21, 2015

(51) Int. Cl.
*G06Q 30/00* (2012.01)
*G06Q 20/32* (2012.01)
*G06Q 20/22* (2012.01)
*G06Q 20/12* (2012.01)
*G06Q 20/20* (2012.01)

(52) U.S. Cl.
CPC .......... *G06Q 20/3224* (2013.01); *G06Q 20/12* (2013.01); *G06Q 20/20* (2013.01); *G06Q 20/22* (2013.01); *G06Q 20/227* (2013.01); *G06Q 20/322* (2013.01)

(58) Field of Classification Search
None
See application file for complete search history.

(56) References Cited

U.S. PATENT DOCUMENTS

| | | | |
|---|---|---|---|
| 2008/0208744 A1* | 8/2008 | Arthur et al. .................. | 705/41 |
| 2014/0006272 A1* | 1/2014 | Calman et al. ................. | 705/40 |
| 2014/0181908 A1* | 6/2014 | Doris-Down ........ | H04W 12/00 726/4 |

\* cited by examiner

*Primary Examiner* — Robert R Niquette
*Assistant Examiner* — Joseph W King
(74) *Attorney, Agent, or Firm* — Haynes and Boone, LLP

(57) ABSTRACT

Systems and methods for retrieving and displaying merchant payment preferences to a user are described. When a user is at or near a merchant location, a service provider determines the type or form of electronic payment the merchant can accept. The service provider then generates the specific type or form of payment for display or communication to a user device. The user is then able to present a type of payment accepted by the merchant and pay for a purchase.

20 Claims, 3 Drawing Sheets

AUTO-DETECTION OF MERCHANT PAYMENT PREFERENCES

BACKGROUND

Field of the Invention

The present invention generally relates to facilitating the payment of merchants at different physical locations.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Consumers typically do not know what forms of mobile payment are accepted by a merchant until check-out, and can sometimes discover, for example, that the merchant only accepts a specific form of payment (e.g., barcode or QR code). This can be inconvenient for the consumer. Thus, there is a need for methods and systems that facilitate the payment for goods and services during check-out.

Figure 1:
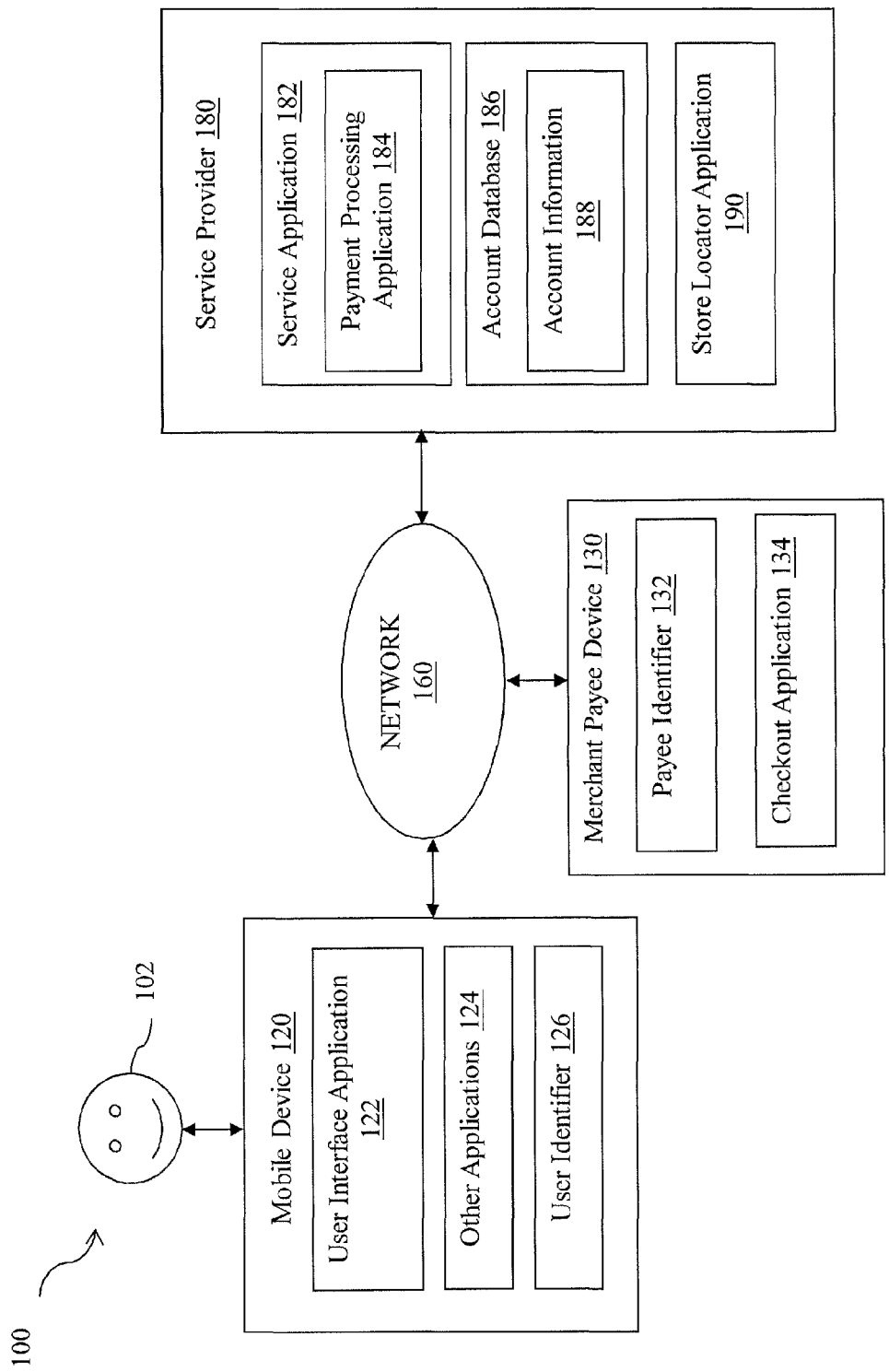
FIG. 1 is a is a block diagram of a networked system suitable for implementing the methods described herein according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for automatically providing a payment method or option to use for a particular merchant without user action. When a user is at or near a merchant location, a service provider determines the type or form of electronic payment the merchant can accept. The service provider then generates the specific type or form of payment for display or communication to a user device. The user is then able to present a type of payment accepted by the merchant. Examples of types of payment include a barcode, Quick Response (QR) code, and high frequency audio signals. If the merchant can accept multiple payment types available for the user to use through the service provider, the service provider may generate one of the types of payment based on different factors. Factors may include the type of user device (e.g., one type may be better suited for one type of user device, such as due to display (e.g., size, resolution), speaker features, etc.), user preset preferences, merchant preset preferences, payment environment (a bright environment may warrant an audio signal, or a noisy environment may warrant an optically scannable code), etc.

FIG. 1 illustrates an exemplary embodiment of a network-based system 100 for implementing one or more processes described herein over a network 160. As shown, network-based system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities. As shown in FIG. 1, the system 100 includes at least one mobile device 120, at least one merchant payee device 130, and at least one service provider server 180 in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network may comprise a wireless telecommunications network (e.g., mobile cellular phone network) adapted to communicate with other communication networks, such as the Internet.

The mobile device 120, in various embodiments, may be implemented using any appropriate combination of hardware and/or software configured for wired and/or wireless communication over the network 160. In various examples, mobile device 120 may be implemented as a wireless telephone (e.g., cellular or mobile phone), a tablet, a personal digital assistant (PDA), a tablet computer, and/or various other generally known types of wired and/or wireless computing devices. It should be appreciated that mobile device 120 may be referred to as a user device or a customer device without departing from the scope of the present disclosure.

The mobile device 120, in one embodiment, may be utilized by the user 102 to interact with the service provider server 180, over the network 160. For example, the user 102 may log in to a mobile application run by the service provider via the mobile device 120.

In various implementations, a user profile may be created using data and information obtained from cellular phone activity over the network 160. Cellular phone activity transactions may be used by the service provider server 180 to create at least one user profile for the user 102 based on activity from the mobile device 120. The user profile may be updated with each financial and/or information transaction (e.g., payment transaction, purchase transaction, etc.) achieved through use of the mobile device 120. In various aspects, this may include the type of transaction and/or the location information from the mobile device 120. As such, the profile may be used for recognizing patterns of potential fraud, setting transaction limits on the user, etc.

The mobile device 120, in one embodiment, includes a user interface application 122, which may be utilized by the user 102 to conduct transactions (e.g., shopping, purchasing, bidding, transferring, etc.) with the service provider server 180 over the network 160. In one aspect, funds may be directly and/or automatically debited from an account related to the user 102 via the user interface application 122 and deposited into an account associated with a merchant.

In one implementation, the user interface application 122 comprises a software program, such as a text-based interface, executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

The mobile device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., a personal identification number) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The mobile device 120, in one embodiment, includes a geo-location component adapted to monitor and provide an instant geographical location (i.e., geo-location) of the mobile device 120. In one implementation, the geo-location of the mobile device 120 may include global positioning system (GPS) coordinates, zip-code information, area-code information, street address information, and/or various other generally known types of geo-location information. In one example, the geo-location information may be directly entered into the mobile device 120 by the user 102 via a user input component, such as a keyboard, touch display, and/or voice recognition microphone. In another example, the geo-location information may be automatically obtained and/or provided by the mobile device 120 via an internal or external GPS monitoring component. In one aspect, when interfacing with the mobile device 120, the user 102 may elect to provide or may be prompted to provide permission for the release of geo-location information. Accordingly, the user 102 may have exclusive authority to allow transmission of geo-location information from the mobile device 120 to the service provider server 180. In any instance, the service provider server 180 may communicate with the mobile device 120 via the network 160 and request permission to acquire geo-location information from the mobile device 120 for geo-location based mobile commerce.

The merchant payee device 130, in various embodiments, may be implemented using any appropriate combination of hardware and/or software configured for wired and/or wireless communication over the network 160. In one embodiment, the merchant payee device 130 includes a point of sale (POS) terminal. The merchant payee device 130 may be maintained, for example, by a conventional or on-line merchant, conventional or digital goods seller, individual seller, and/or application developer offering various products and/or services in exchange for payment to be received conventionally or over the network 160.

The merchant payee device 130, in one embodiment, may be utilized by user 102 to interact with the service provider server 180 over the network 160. For example, user 102 may conduct financial transactions (e.g., payment of a merchant) with the service provider server 180 via the merchant payee device 130. The merchant payee device 130 may include one or more payee device identifiers 132, which may be implemented as operating system registry entries, identifiers associated with hardware of the merchant payee device 130, and/or various other appropriate identifiers. The payee device identifier 132 may include attributes related to the merchant payee device 130, such as identification information (e.g., merchant associated with the merchant payee device 130, a location address, GPS coordinates, etc.).

In various implementations, the payee device identifier 132 may be passed with network traffic data and information to the service provider server 180, and the payee device identifier 132 may be used by the service provider server 180 to associate one or more network transactions of user 102 with one or more particular user financial accounts maintained by the service provider server 180.

The merchant payee device 130 also includes a checkout application 134 which may be configured to facilitate a purchase by user 102. The checkout application 134 may be configured to accept payment information from the user 102 through the mobile device 120, directly from the user 102, and/or from the service provider through service provider server 180 over the network 160.

The service provider server 180, in one embodiment, may be maintained by a transaction processing entity, which may provide processing for financial transactions and/or information transactions between the user 102 and merchant payee device 130. As such, the service provider server 180 includes a service application 182, which may be adapted to interact with the mobile device 120 over the network 160 to facilitate financial transactions. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and a merchant. In one implementation, the payment processing module 184 assists with resolving financial transactions through validation, delivery, and settlement. As such, the service application 182 in conjunction with the payment processing application 184 settles indebtedness between the user 102 and a merchant, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., user 102) and/or merchants. For example, account information 188 may include private financial information of a user and/or merchant, such as one or more account numbers, passwords, credit card information, banking information, or other types of financial information, which may be used to facilitate financial transactions between the user 102 and a merchant. In various embodiments, account information 188 includes merchant information such as merchant ID, physical address, GPS location, hours of operation, customer review scores, current offers, accepted forms of payment, etc. It should be appreciated that the methods and systems described herein may be modified to accommodate users and merchants that may or may not be associated with at least one existing user account.

In some embodiments, service provider server 180 also includes a store locator application 190, which tracks the location of the user 102 via the mobile device 120 and provides a list of merchants near the mobile device 120. In various embodiments, the store locator application 190 determines payment methods that are acceptable by the merchant and displays the payment methods to the user 102.

Figure 2:
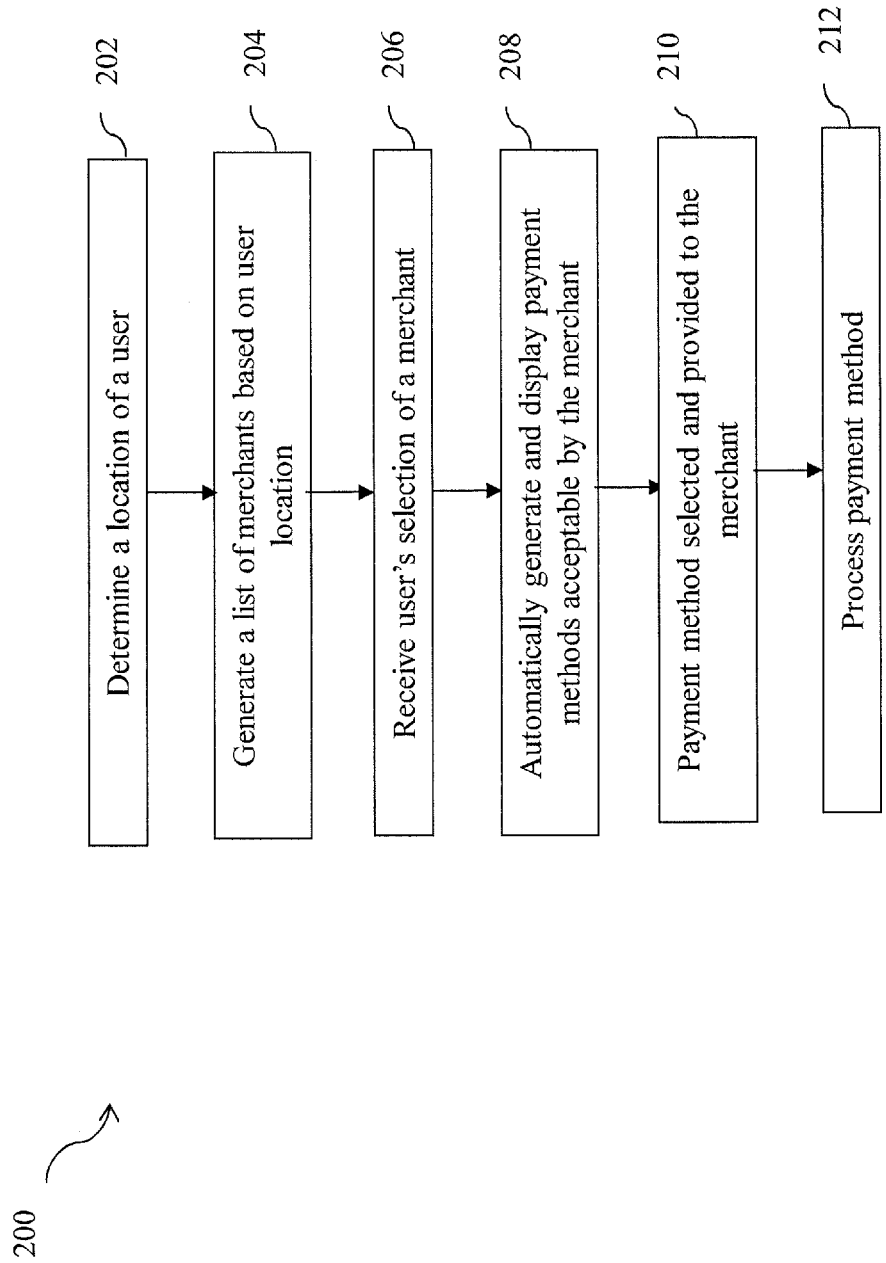
FIG. 2 is a flowchart showing a method for facilitating payment with a mobile device according to an embodiment of the present disclosure.

Referring now to FIG. 2, a method 200 for facilitating payments with a mobile device is illustrated according to an embodiment of a present disclosure. In the embodiment of the method 200 described below, a service provider provides user 102 with a user account, and the user 102 may use the user account to fund payments for purchases made to merchant payees. The service provider may be, for example, PayPal®, Inc. of San Jose, Calif., which assists in the making of payments from the user 102 to the merchant by transferring funds from the user account to a merchant account. However, these embodiments are meant to be merely exemplary, and one of skill in the art will recognize that a variety of modifications may be made to the payment system discussed herein without departing from the scope of the present disclosure.

The method 200 begins at step 202, where a location of the user 102 is determined. The mobile device 120, in one embodiment, includes a location determination device (e.g., a GPS device, a cell tower triangulation system device, and/or a variety of other location determination devices known in the art) that is operable to determine a current location of mobile device 120.

User 102 may release geo-location information to the service provider server 180 by, e.g., setting release parameters. In one aspect, the user geo-location information includes user information related to a physical location or position of the mobile device 120, which are passed to the service provider server 180 via the network 160. The user geo-location information may include GPS coordinates (e.g., longitude and latitude) inherent to the mobile device 120, such as a mobile cellular phone, and/or zip-code information. The user geo-location information may include user identifier information identifying the user 102. The user 102 may manually set geo-location information, such as a zip code and/or longitude and latitude coordinates.

At step 204, the service provider server 180 generates a list of merchants based on the user location. In one embodiment, the merchants are proximate the mobile device 120, i.e., at or near the mobile device 120. Based on the user's privacy settings and preferences, the list of merchants can be automatically generated when the user 102 is physically close or near to the location, i.e., without a request from the user. By "close" or "near" is meant a predetermined distance from the location, such as within the same zip code, the same shopping mall, the same city, or within 12 feet.

In some embodiments, the user 102 further filters and ranks the list of merchants according to user preferences. For example, the user 102 can select what category or kind of merchant he or she is interested in, and the order in which he or she wants the results to appear. The service provider server 180 may then generate and display a list of merchants based on the user's input and preferences. For example, the user 102 may only be interested in Italian restaurants so only Italian restaurants in the vicinity of the user 102 are displayed on the mobile device 120.

At step 206, the user 102 selects a merchant, and may check-in or register with the merchant on the mobile device 120. Once the user 102 inputs a selection, at step 208, the service provider server 180 automatically generates and displays payment methods or options acceptable by the selected merchant. For example, the service provider server 180 may retrieve merchant payment preferences from account database 186. The payment methods may include a variety of electronic payment methods, such as use of barcodes, numeric codes, QR codes, credit card, debit card, gift card, rewards, points, credits, electronic voucher, phone and PIN, high frequency audio signals, check-in, etc.

In some embodiments, the acceptable payment methods are viewable in a single screen to enable simultaneous and comprehensive analysis of the multiple payment methods by the user 102. People often have preferences as to which source of funds should be used to pay certain payment obligations. A bank account may be desired for some payments, while a credit card may be desired for other transactions. As such, the user 102 can elect or may have previously elected to only view certain payment methods, depending on the merchant involved. For example, the user 102 may have elected to view methods that involve codes (e.g., barcodes, QR codes, etc.), but not to view any methods that involve a card (e.g., credit card, debit card, etc.) for a particular merchant. The user 102 may also have elected to rank payment methods, e.g., credit card first, debit card second, check third, QR code fourth, etc. The payment methods or options can then be displayed according to the user preferences and rankings.

In other embodiments, the payment methods may be ranked and displayed according to merchant preferences or other factors. If neither the user 102 nor the merchant have provided preferences, the payment methods may be ranked and displayed according to default settings put into place by the service provider. Many variations of display preferences and filters may be specified. In one embodiment, the service provider determines what type of user device is being used, and presents the user with the payment methods accepted by the merchant and best suited for the user device. For instance, if the user device is a mobile phone that is not equipped to display a barcode or a QR code, then the service provider may display a payment method that uses high frequency audio signals. In another embodiment, the environment in which payment is to be made may be analyzed. Environment conditions may be detected using sensors on the user device or other sensors at the merchant location. For example, the service provider may detect that an environment is very dark and that it would be difficult to scan a barcode or QR code. The service provider may then rank payment by high frequency audio signal at the top of a list.

At step 210, when the user 102 is ready to pay for the purchase, the user 102 selects a payment method, and the payment method is provided to the merchant payee device 130. For example, a credit or debit card can be swiped, a code can be input by the user or a cashier at POS, or if the code is a barcode or QR code, the code is scanned by the cashier.

At step 212, the service provider receives the payment method and a request for payment from the merchant, and approves and processes the payment method. After processing, the service provider may then transmit a notification to the user and/or the merchant.

Example

A particular example will now be described. A regional chain of coffee shops named Ben's Coffee & Cakes decided to use PayPal Here™ at some locations that support check-in by a user, and QR codes at other locations. Colin, a PayPal® customer, is a frequent shopper at Ben's Coffee & Cakes and visits many different locations.

One morning, Colin went to Location A of Ben's Coffee & Cakes, and a PayPal® mobile application on his phone detected that it could simply check him in through Location A's PayPal Here™ integration. Colin paid using PayPal Here™, and then went about his day. Later that afternoon, Colin goes across town near Location B, which only supports QR codes. Colin walked in to get a coffee, and the mobile application automatically brought up the QR code for him to use. Colin paid at Location B using the QR code.

Figure 3:
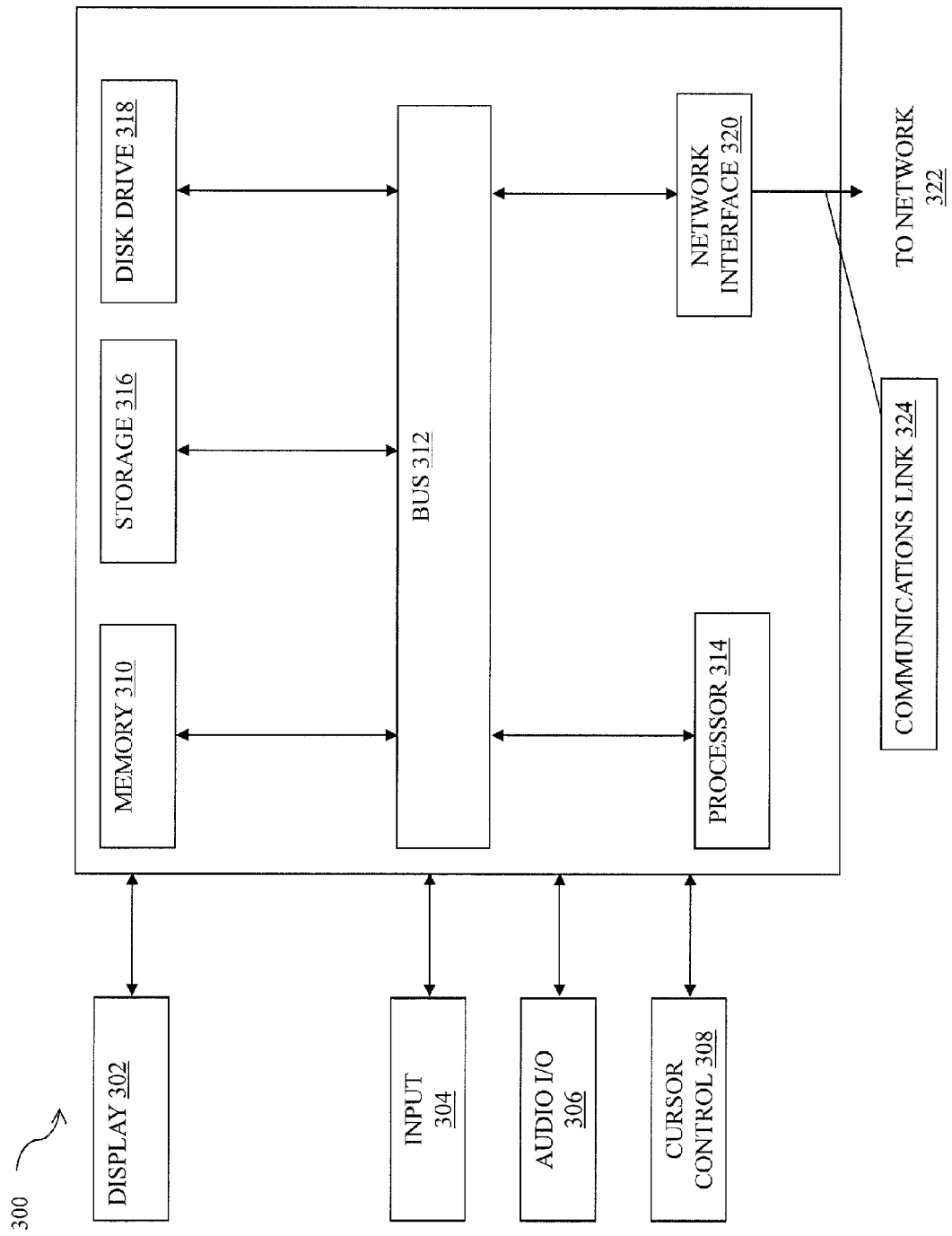
FIG. 3 is a block diagram of a computer system suitable for implementing one or more components in FIG. 1 according to one embodiment of the present disclosure.

FIG. 3 is a block diagram of a computer system 300 suitable for implementing one or more embodiments of the present disclosure, including the mobile device 120, the merchant payee device 130, and the service provider server 180. In various implementations, the merchant payee device 130 may comprise a stand-alone computing device, such as an interactive computer terminal, the mobile device 120 may comprise a mobile cellular phone, personal computer (PC), laptop, PDA, etc. adapted for wireless communication, and the service provider server 180 may comprise a network computing device, such as a server. Thus, it should be appreciated that the devices 120, 130, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, third party and/or payment provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a payment provider server via network 328. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors communicatively coupled to the non-transitory memory and configured to read instructions from the non-transitory memory which are stored thereon to cause the system to perform operations comprising:
        determining a location of a mobile device of a user by obtaining global positioning coordinates from a geo-location component of the mobile device;
        determining a merchant at the location of the mobile device;
        determining one or more payment methods acceptable by the merchant;
        receiving one or more ambient light conditions of a physical environment of the merchant where a payment is to be made from the mobile device, the one or more ambient light conditions being detected by one or more sensors of the mobile device;
        determining that the one or more ambient light conditions at the physical environment are not favorable for scanning an optical code;
        automatically generating a list including at least one payment method from the one or more payment methods acceptable by the merchant at the location of the mobile device and based on the detected one or more ambient light conditions in the physical environment of the merchant;
        displaying the list including the at least one payment method on a graphical user interface (GUI) of the mobile device, wherein a payment method using audio signals is placed at a top of the list;
        receiving a selection of a payment method from the list through the GUI of the mobile device; and
        processing a user purchase transaction using the selected payment method.

2. The system of claim 1, wherein the operations further comprise receiving preferred payment methods from the user.

3. The system of claim 1, wherein the one or more payment methods comprise one or more of a numeric code, QR code, barcode, credit card, debit card, high frequency audio signal, check-in, phone number and personal identification number.

4. The system of claim 1, wherein the operations further comprise ranking and displaying the one or more payment methods acceptable by the merchant according to merchant preferences.

5. The system of claim 1, wherein the operations further comprise generating a list of merchants based on the location of the mobile device.

6. The system of claim 5, wherein the operations further comprise receiving a selection of a merchant from the list of merchants from the user through the GUI of the mobile device.

7. The system of claim 1, wherein the operations further comprise receiving preferred merchants from the user.

8. A method of facilitating payments with a mobile device, comprising:
    determining, by one or more hardware processors of a service provider, a location of a mobile device of a user by obtaining global positioning coordinates from a geo-location component of the mobile device;
    determining, by the one or more hardware processors, a merchant at the location of the mobile device;
    determining, by the one or more hardware processors, one or more payment methods acceptable by the merchant;
    receiving, by the one or more hardware processors from the mobile device, one or more ambient light conditions of a physical environment of the merchant where a payment is to be made, the one or more ambient light conditions being detected by one or more sensors of the mobile device;
    determining, by the one or more hardware processors, that the one or more ambient light conditions at the physical environment are not favorable for scanning an optical code;
    automatically generating, by the one or more hardware processors, a list including at least one payment method from the one or more payment methods acceptable by the merchant at the location of the mobile device and based on the detected one or more ambient light conditions in the physical environment of the merchant;
    displaying, by the one or more hardware processors, the list including the at least one payment method on a graphical user interface (GUI) of the mobile device, wherein a payment method using audio signals is placed at a top of the list;
    receiving, by the one or more hardware processors, a selection of a payment method from the list through the GUI of the mobile device; and
    processing, by the one or more hardware processors, a user purchase transaction using the selected payment method.

9. The method of claim 8, further comprising receiving preferred payment methods from the user.

10. The method of claim 8, wherein the one or more payment methods comprise one or more of a numeric code, QR code, barcode, credit card, debit card, high frequency audio signal, check-in, phone number and personal identification number.

11. The method of claim 8, further comprising ranking and displaying the one or more payment methods acceptable by the merchant according to merchant preferences.

12. The method of claim 8, further comprising generating a list of merchants based on the location of the mobile device.

13. The method of claim 12, further comprising receiving a selection of a merchant from the list of merchants from the user through the GUI of the mobile device.

14. The method of claim 8, further comprising receiving preferred merchants from the user.

15. A non-transitory machine-readable medium having stored thereon machine-readable instructions executable to cause a machine to perform operations comprising:

determining a location of a mobile device of a user by obtaining global positioning coordinates from a geo-location component of the mobile device;
determining a merchant at the location of the mobile device;
determining one or more payment methods acceptable by the merchant;
receiving one or more ambient noise conditions of a physical environment of the merchant where a payment is to be made from the mobile device, the one or more ambient noise conditions being detected by one or more sensors of the mobile device;
determining that the one or more ambient noise conditions are not favorable for using an audio payment method;
automatically generating a list including at least one payment method from the one or more payment methods acceptable by the merchant at the location of the mobile device and based on the detected one or more ambient noise conditions in the physical environment of the merchant;
displaying the list including the at least one payment method on a graphical user interface (GUI) of the mobile device, wherein a payment method using an optically scannable code is placed at a top of the list;
receiving a selection of a payment method from the list through the GUI of the mobile device; and
processing a user purchase transaction using the selected payment method.

16. The non-transitory machine-readable medium of claim 15, wherein the operations further comprise receiving preferred payment methods from the user.

17. The non-transitory machine-readable medium of claim 15, wherein the one or more payment methods comprise one or more of a numeric code, QR code, barcode, credit card, debit card, high frequency audio signal, check-in, phone number and personal identification number.

18. The non-transitory machine-readable medium of claim 15, wherein the operations further comprise generating a list of merchants based on the location of the mobile device.

19. The non-transitory machine-readable medium of claim 18, wherein the operations further comprise receiving a selection of a merchant from the list of merchants from the user through the GUI of the mobile device.

20. The non-transitory machine-readable medium of claim 15, wherein the operations further comprise receiving preferred merchants from the user.

* * * * *